United States Patent [19]
Zito

[11] Patent Number: 5,775,127
[45] Date of Patent: Jul. 7, 1998

[54] HIGH DISPERSION CARBON DIOXIDE SNOW APPARATUS

[76] Inventor: Richard R. Zito, 5511 N. Fort Yuma Trail, Tucson, Ariz. 85705

[21] Appl. No.: 862,979

[22] Filed: May 23, 1997

[51] Int. Cl.$^6$ ........................................... F25J 1/00
[52] U.S. Cl. ........................................ 62/603; 62/384
[58] Field of Search .................................. 62/384, 603

[56] References Cited

U.S. PATENT DOCUMENTS

| | | | |
|---|---|---|---|
| D. 322,341 | 12/1991 | Zito | D32/32 |
| D. 372,071 | 7/1996 | Zito | D23/213 |
| 3,254,506 | 6/1966 | Braeking | 62/384 |
| 3,443,389 | 5/1969 | Townsend et al. | 62/35 |
| 3,667,242 | 6/1972 | Kilburn | 62/10 |
| 3,677,020 | 7/1972 | Munselle | 62/10 |
| 3,681,930 | 8/1972 | Tyree, Jr. | 62/603 |
| 3,807,187 | 4/1974 | Vorel | 62/76 |
| 3,932,155 | 1/1976 | Pietrucha et al. | 62/10 |
| 4,111,362 | 9/1978 | Carter, Jr. | 239/1 |
| 4,111,671 | 9/1978 | Williamson | 62/603 |
| 4,166,364 | 9/1979 | Ruprecht et al. | 62/384 |
| 4,287,719 | 9/1981 | Students | 62/10 |
| 4,325,720 | 4/1982 | Students | 62/35 |
| 4,356,707 | 11/1982 | Tyree, Jr. et al. | 62/384 |
| 4,372,130 | 2/1983 | Klee et al. | 62/330 |
| 4,390,356 | 6/1983 | Preiss et al. | 62/603 |
| 4,415,346 | 11/1983 | Love | 62/603 |
| 4,911,362 | 3/1990 | Delich | 239/2.2 |
| 4,915,362 | 4/1990 | Borasci et al. | 266/266 |
| 5,125,979 | 6/1992 | Swain et al. | 134/7 |
| 5,364,474 | 11/1994 | Williford, Jr. | 134/32 |
| 5,462,468 | 10/1995 | Bailey et al. | 445/59 |
| 5,473,903 | 12/1995 | Lloyd et al. | 62/35 |
| 5,538,184 | 7/1996 | Karbanowicz et al. | 239/14.2 |
| 5,605,484 | 2/1997 | Bailey et al. | 45/59 |
| 5,613,509 | 3/1997 | Kolb et al. | 134/56 R |

OTHER PUBLICATIONS

W.D. Kimura et al., "Comparison of Laser and $CO_2$ Snow for Cleaning Large Astronomical Mirrors", Large Mirror Coating and Cleaning Workshop, CFHT Apr. 27, 1995.

B. Magrath and D. Nahrstedt, "Cleaning the CFHT Primary Mirror", Large Mirror Coating and Cleaning Workshop, CFHT Apr. 27, 1995.

R.R. Zito, "Cleaning Large Optics with $CO_2$ Snow", SPIE vol. 1236 (1990).

B. Magrath and D. Nahrstedt, "A Cleaning Process for the CFHT Primary Mirror", Ast. Soc. of the Pac., 108, 620–623, Jul. 1996.

B. Magrath, "Reflectivity Degradation Rates of Aluminum Coatings at the CFHT", unpublished report available through CFHT, P.O. Box 1597, Kamuela, HI 96743.

D.W. Toomey, "Emissivity Experiments at the NASA Infrared Telescope Facility", Large Mirror Coating and Cleaning Workshop, CFHT Apr. 27, 1995, P.O. Box 1597, Kamuela, HI 96743.

Y. Torii, et al. "Mirror Cleaning Experiments in Japan", Large Mirror Coating and Cleaning Workshop, CFHT Apr. 27, 1995, P.O. Box 1597, Kamuela HI 96743.

Advertising flier for "Motemaster" by Emadel Enterprises, Inc.

Advertising flier for "Eco–Snow" by Hughes Aircraft Company.

U.S. Ser. No. 29/067,645, Zito, filed Mar. 3,1997 (pending).

*Primary Examiner*—Donald C. Capossela

[57] ABSTRACT

An apparatus capable of producing carbon dioxide snowflakes for the purpose of cleaning optics and other delicate surfaces. Carbon dioxide tanks (10) send liquid carbon dioxide to nozzles (110) where the liquid is throttled into a mixture of carbon dioxide snowflakes and gas. The snowflakes grow as they move through drift tubes (120) and develop a soft, fluffy, structure capable of wiping a delicate optical surface clean without causing scratching. The flow of snowflakes and gas are scattered by a turbine head (152) which turns by means of a jet of nitrogen gas emerging from a tube (240). Both the nitrogen gas and carbon dioxide flows can be controlled by a nitrogen flow pneumatic valve (212) and a carbon dioxide flow pneumatic valve (42) respectively. Both of these pneumatic valves can ultimately be controlled by a computer (530).

3 Claims, 3 Drawing Sheets

HIGH DISPERSION CARBON DIOXIDE SNOW APPARATUS

BACKGROUND-FIELD OF INVENTION

This invention relates to an apparatus capable of producing soft carbon dioxide snowflakes used for cleaning optics and delicate surfaces in general.

BACKGROUND - DESCRIPTION OF PRIOR ART

The use of carbon dioxide snowflakes for cleaning optics is a well established, but largely unpatented art. The first major publication on cleaning large optics with carbon dioxide snow was authored by the applicant in 1990 ("Cleaning Large Optics with CO2 Snow", SPIE vol. 1236, pp. 952–971). This publication described how soft carbon dioxide snowflakes, impinging on a surface, can wipe a surface clean. The applicant has also filed a design patent on a carbon dioxide snow cleaning apparatus in 1989(U.S. Pat. Des. No. 322,341). There are other similar carbon dioxide snow cleaning devices on the market as well. However, most of the prior art concerning carbon dioxide snow cleaning is unpatented. One major problem with the available cleaning equipment in that the beam of snowflakes emerging from the cleaning apparatus is quite narrow, so that the apparatus must be swept mechanically, or manually, over a telescope mirror or any other large surface to be cleaned. Furthermore, many units have an insufficiently high output of snowflakes to effectively clean the largest telescopes. These limitations have been overcome in the present invention.

SUMMARY OF ADVANTAGES

This invention describes a cleaning apparatus capable of generating and broadcasting snowflakes through a large apex angle so that slewing is not necessary. This means that the apparatus described in this application can be permanently mounted at a fixed location on a telescope. Such simple mounting greatly reduces the cost of the present apparatus over mechanically slewed units. Furthermore, the reduction of mechanical parts means that computer control of the apparatus is easy, even from remote locations. Also, for large telescope mirrors, many of which are reaching 10 meters in diameter today, hand cleaning with carbon dioxide snow can become tedious. Furthermore, hand cleaning can result in missed areas which usually appear as "striping" (alternating cleaned and partially cleaned strips) on an optical surface. The apparatus of this invention spreads the snowflakes over a large area promoting fast and more uniform cleaning.

Accordingly, besides the objects and advantages of the High Dispersion Carbon Dioxide Snow Apparatus described above, several objects and advantages of the present invention are:

(a) to provide a carbon dioxide snow optics cleaning apparatus capable of generating and broadcasting snowflakes through a large apex angle;

(b) to provide a carbon dioxide snow optics cleaning apparatus which has a high snowflake output;

(c) to provide a carbon dioxide snow optics cleaning apparatus which does not have to be slewed;

(d) to provide a carbon dioxide snow optics cleaning apparatus which can complete a cleaning job quickly;

(e) to provide a carbon dioxide snow optics cleaning apparatus which can more uniformly clean a large optical surface;

(f) to provide a carbon dioxide snow optics cleaning apparatus which can easily be computer controlled;

(g) to provide a carbon dioxide snow optics cleaning apparatus which can be controlled from a remote location;

(h) to provide a carbon dioxide snow optics cleaning apparatus which is highly reliable and requires little maintenance;

(i) to provide a carbon dioxide snow optics cleaning apparatus which can be computer controlled;

(j) to provide a carbon dioxide snow optics cleaning apparatus which is easy to operate.

Further objects and advantages will become apparent from a consideration of the ensuing description and drawings.

DRAWING FIGURES

Figure 1:
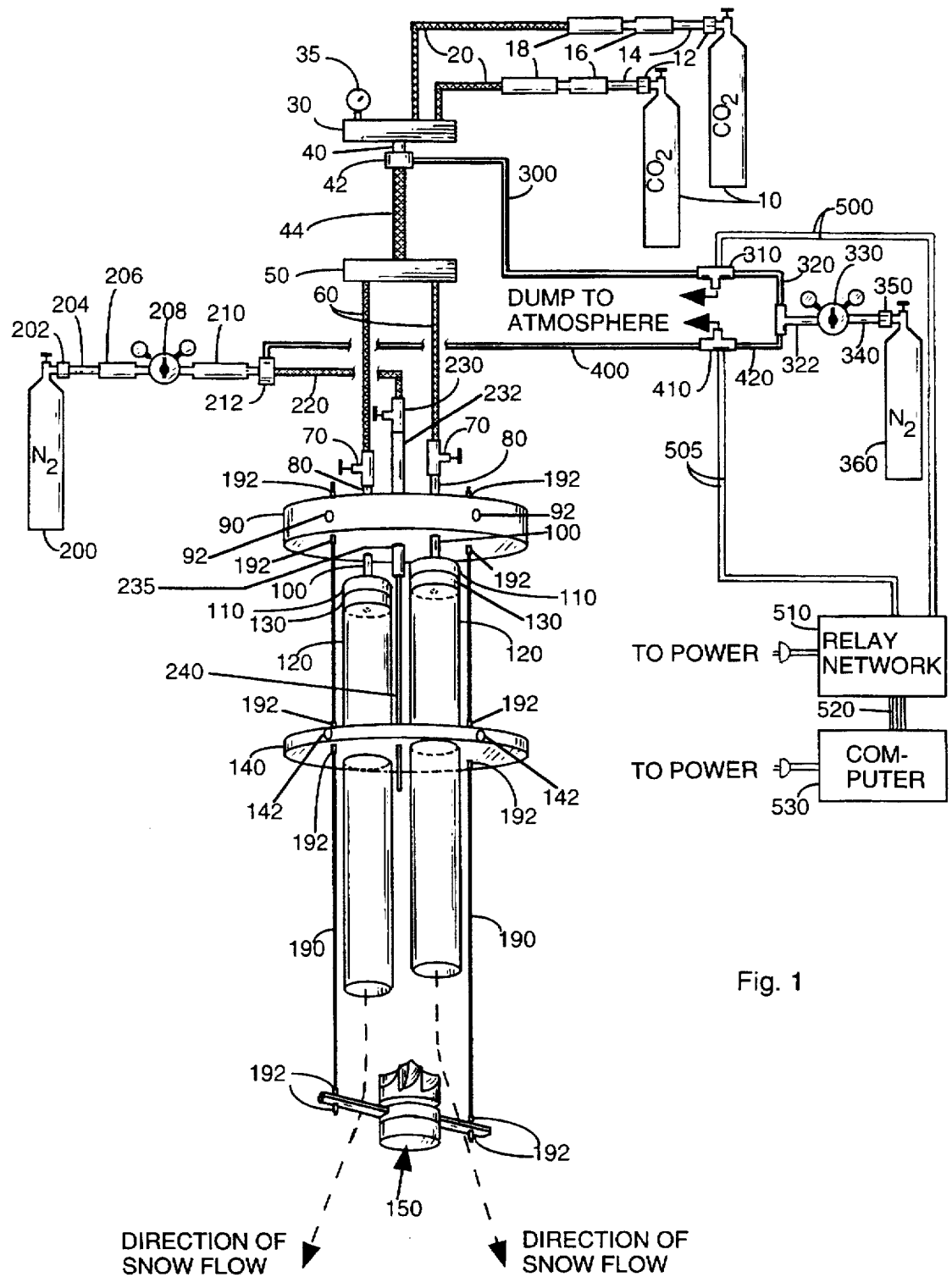
FIG. 1 shows an overview of the High Dispersion Carbon Dioxide Snow Apparatus.

REFERENCE NUMERALS IN DRAWINGS 10 carbon dioxide tanks
12 carbon dioxide nuts
14 carbon dioxide nipples
16 carbon dioxide excess flow check valves
18 carbon dioxide filters
20 carbon dioxide tank flexible high pressure lines
30 primary manifold
35 primary manifold pressure gauge
40 primary manifold nipple
42 carbon dioxide flow pneumatic valve
44 flexible large diameter carbon dioxide high pressure line
50 secondary manifold
60 secondary manifold outlet high pressure lines
70 carbon dioxide manual metering valves
80 carbon dioxide manual metering valve outlet nipples
90 mounting plate
92 threaded mounting plate holes
100 mounting plate outlet nipples
110 nozzles
115 throttling aperture
120 drift tubes
130 collars
135 collar screws
140 support plate
142 threaded support plate holes
150 turbine assembly
152 turbine head
154 upper race
156 thrust bearings
158 lower race
160 turbine shaft
162 roller bearings
164 turbine shaft and roller bearing housing
166 external retaining ring
168 oil case
170 oil level observation window
180 O-ring
174 mounting arms
176 mounting holes
178 threaded turbine assembly holes 190 support rods
192 support rod nuts
200 turbine nitrogen gas tank
202 turbine nitrogen gas nut
204 turbine nitrogen gas nipple
206 turbine nitrogen gas excess flow check valve
208 turbine nitrogen gas regulator
210 turbine nitrogen gas filter
212 nitrogen flow pneumatic valve
220 flexible turbine nitrogen gas line
230 turbine nitrogen gas manual metering valve
232 nipple
235 coupling
240 tube
300 carbon dioxide flow control gas line
310 carbon dioxide flow solenoid valve
320 carbon dioxide flow solenoid valve control gas supply line
322 control gas "T"
330 control gas regulator
340 control gas nipple
350 control gas nut
360 control gas tank
400 nitrogen flow control gas line
410 nitrogen flow solenoid valve
420 nitrogen flow solenoid valve control gas supply line
500 carbon dioxide flow solenoid control wires
505 nitrogen flow solenoid control wire
510 relay network
520 relay control ribbon
530 computer

DETAILED DESCRIPTION OF INVENTION-FIGS. 1 TO 3

FIG. 1 shows an overview of the present invention. A plurality of carbon dioxide tanks 10 hold the liquid carbon dioxide used for the cleaning apparatus. These tanks usually contain a siphon so that liquid carbon dioxide is forced through a plurality of carbon dioxide nipples 14 which are connected to tanks 10 in a one to one fashion by a plurality of carbon dioxide nuts 12. Next, the liquid carbon dioxide passes through a plurality of excess flow check valves 16, and then through a plurality of carbon dioxide filters 18. Each nipple has its own check valve and filter. Excess flow check valves 16 seal carbon dioxide tanks 10 automatically in the event of a sudden drop in pressure caused by blowout of some down stream component. Carbon dioxide filters 18 purify the liquid carbon dioxide by removing any large particles from the liquid which might ultimately be propelled toward, and damage, a delicate piece of optics. Other types of filters may be used in addition to, or instead of, particle filters to remove such impurities as hydrocarbons, water, or other substances. Now, the liquid carbon dioxide can flow into a plurality of carbon dioxide tank flexible high pressure lines 20. Each tank has its own high pressure line. High pressure lines 20 are PTFE lined on the inside to prevent introduction of chemical impurities into the liquid carbon dioxide. The exterior of high pressure lines 20 are made of braided stainless steel wires to provide strength under the high pressures produced by the liquid carbon dioxide (approximately 750 psi at 20 deg. C). A braided brass covering is also available for high pressure lines 20, but is not as strong as that made of stainless steel. Carbon dioxide tank flexible high pressure lines 20 transfer liquid carbon dioxide to a primary manifold 30. The pressure within manifold 30 can be monitored by a primary manifold pressure gauge 35, which is connected to primary manifold 30. Liquid carbon dioxide leaving primary manifold 30 passes into a primary manifold nipple 40 which connects primary manifold 30 to a carbon dioxide flow pneumatic valve 42. Valve 42 is normally closed so that no carbon dioxide can flow in the event of a power failure. The valve is opened by injecting a control gas (usually nitrogen, air, or some other benign gas) into a special control gas port on the valve body. All the equipment described so far can be mounted together at a single location on a cart or against a wall in, for example, an observatory. Next, it is necessary to describe how the liquid carbon dioxide is transferred to a location where carbon dioxide snowflakes will be made for cleaning operations.

When valve 42 is open, liquid carbon dioxide passes through a flexible large diameter carbon dioxide high pressure line 44. In other words, primary manifold 30 has allowed several smaller diameter high pressure lines to be replaced by a single line. If n small diameter lines of diameter d feed into manifold 30, then the diameter of line 44 should be d times the square root of n. Line 44 can be quite long. For example, it can run from primary manifold 30, which is usually near tanks 10, all the way to a location above the primary mirror of a large telescope. The principal part of the apparatus is mounted at this location and produces snowflakes used to clean the primary mirror. It would not be unusual for line 44 to be 15 to 33 meters long, although other lengths are possible. Hence, reducing several high pressure lines to one saves money, as well as effort in mounting and maintaining the system. Next, the method of production and dispersal of carbon dioxide snowflakes will be described.

Figure 2:
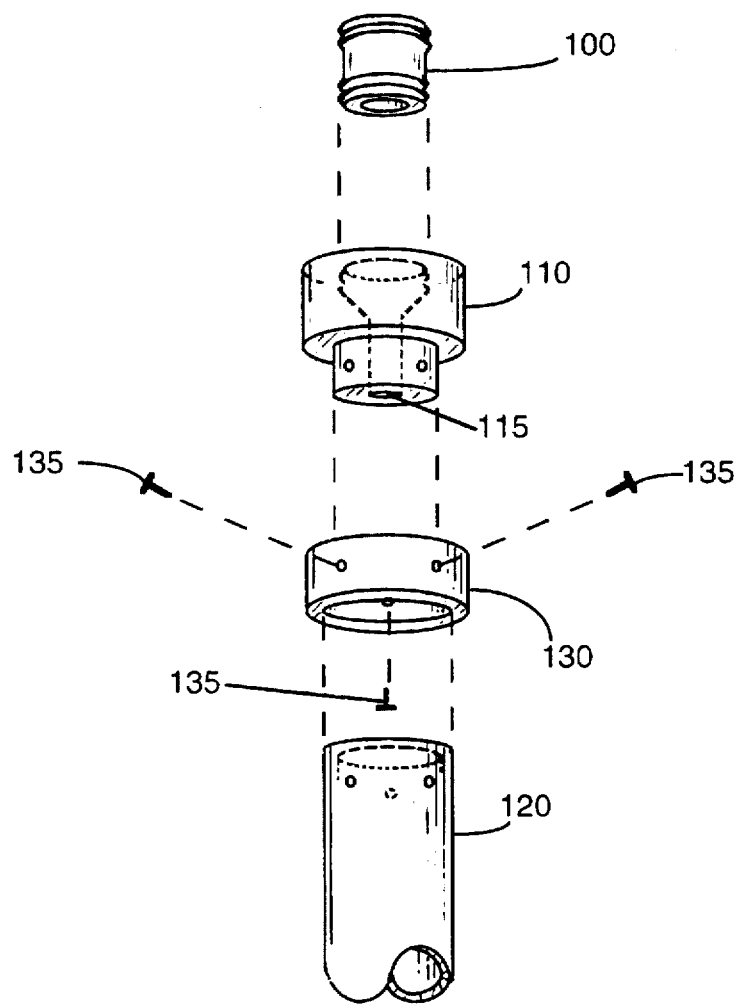
FIG. 2 shows an isometric exploded view of the top of a drift tube.

Line 44 delivers liquid carbon dioxide to a secondary manifold 50 having a plurality of outlets. Secondary manifold 50 is mounted close to where carbon dioxide snowflakes are made in the principal part of the apparatus. Liquid carbon dioxide can now flow into a plurality of flexible secondary manifold outlet high pressure lines 60. The pressure is exactly the same in all lines 60 because they are fed from a single manifold to which they are connected. This fact will prove important later. Lines 60 are connected to a plurality of carbon dioxide manual metering valves 70 in a one to one fashion. Metering valves 70 can be adjusted by hand to give the desired flow of liquid carbon dioxide. This flow will depend on the range of the piece to be cleaned from the point of snowflake generation. It is best to adjust all metering valves 70 to give the same flow. This point will be returned to later. A plurality of carbon dioxide manual metering valve outlet nipples 80 connect metering valves 70 (one valve outlet nipple per metering valve 70) to a mounting plate 90. Furthermore, a plurality of mounting plate outlet nipples 100 connect mounting plate 90 to a plurality of nozzles 110 in a one to one fashion. If pipe threads are used as a method of attaching components, the mounting plate 90 must be thick enough to allow valve outlet nipples 80 and mounting plate outlet nipples 100 to be screwed into mounting plate 90 deep enough to form air tight seals. Furthermore, mounting plate 90 must be wide enough to allow part screwed into place without blocking one another. Liquid carbon dioxide can now pass from valves 70 through valve outlet nipples 80, mounting plate 90, and mounting plate outlet nipples 100 to nozzles 110. It is during throttling within nozzles 110 that the liquid carbon dioxide begins its phase change to a mixture of carbon dioxide snow (dry ice) crystals and carbon dioxide gas. At first the carbon dioxide snowflakes are small, but as the high speed snowflakes glide through a plurality of drift tubes 120, which are connected to nozzles 110 in a one to one manner by a plurality of collars 130 and collar screws 135, they grow into large, ornate, soft, snowflakes which are suitable for cleaning delicate optical surfaces. Nozzles 110 are usually made of stainless steel, although nylon nozzles have also been used. Other metallic, polymeric, and ceramic materials may be used as well. When nozzles 110 are made of stainless steel, they should have a throttling aperture 115 approximately 1.27 cm (0.5 in.) long and 0.476 cm (0.1875 in.) in diameter. However, other lengths and diameters will also work. Drift tubes 120 have an inside diameter of 2.2225 cm (0.875 in.), a wall thickness of 0.159 cm (0.0625 in.), and a length of 78.7 cm (31 in.). Other drift tube dimensions can also be used successfully. Drift tubes 120 are usually made of polycarbonate plastic tubing, but other materials can also be used. Collar screws 135 should preferably be made of stainless steel to prevent condensation induced corrosion, although other materials can also be used. Furthermore, collar screws 135 should be used with a positive locking device such as a stainless steel lock washer, or a thread sealing compound, or both. The isometric exploded view of the top of drift tubes 120 in FIG. 2 exhibits construction details. Drift tubes 120 are mechanically stabilized and prevented from flexing by passing through a support plate 140 which insures accurate spacing of the drift tubes. This will be discussed in more detail in the next paragraph which deals with spreading the beam of snowflakes exiting from drift tubes 120.

The beam of carbon dioxide snowflakes which emerges from drift tubes 120 intercepts a turbine assembly 150 which is a scattering means. The spinning turbine head 152 (FIG. 3) scatters snowflakes in all directions. The top of turbine head 152 lies approximately 0.635 cm (0.25 in.) below the bottom of drift tubes 130. The quantity of snowflakes that are scattered into each differential solid angle about the vertical direction below the apparatus will depend on how much overlap there is between the cross sectional area of drift tubes 120 and the cross sectional area (in the top view) of turbine head 152. Hence, it is now clear why accurate positioning of drift tubes 120 is so important. Furthermore, the scattering of snowflakes will depend on the speed of rotation of turbine head 152 as well as its exact shape. Many useful shapes are possible for turbine head 152, but a 5.08 cm diameter (2 in.) corner rounding end mill (manufactured by DoAll Co., Desplaines Ill. 60016) works well. In that case, the distance between the centers of the drift tubes shown in FIG. 1 should be 4.940 cm (1.945 in.). Although other spacings are possible, these figures provide the experimenter with a starting point. Turbine head 152 can be made of metal, plastic, or ceramic. Plastic heads have the advantage of corrosion resistance and have low thermal conductivity. The latter property will soon be shown to be particularly important. However, plastic heads are not as strong as heads made of steel or other metals, and ceramic heads may crack. Another possible design is to use insulating coatings over a metal head, thereby creating both corrosion resistance as well as low thermal conductivity. This technique has been used successfully in prototype devices. Methylmethacrylate copolymer film formers dissolved in a solvent system of toluene and 2-methoxyethanol were used (R. J. Haasl, U.S. Pat. No. 4,536,454, 1985). This mixture is sold by PDI, Inc. (P.O. Box 130, Circle Pines, Minn. 55014) under the trade name PLASTI-DIP. The long term strength of this coating is unknown.

Turbine head 152 sits on an upper race 154 which rolls on a set of thrust bearings 156. These thrust bearings then roll on a lower race 158. Upper race 154, thrust bearings 156, and lower race 158, are all preferably, but not necessarily, made of stainless steel. This system of bearings and races supports the head in the presence of vertical forces and provides smooth rotation. These construction details can be clearly seen in FIG. 3. Extending below turbine head 152 is a turbine shaft 160 (see FIG. 3). Turbine shaft 160 rolls within a set of roller bearings 162. Roller bearings 162 support turbine head 152 through turbine shaft 160 when the apparatus is tipped so that lateral forces are produced on the turbine head through gravity. If drift tubes 120 discharge equal flows of carbon dioxide onto turbine head 152, the head will roll smoothly in its system of bearings. Unequal flows may cause "chattering" of the head within the bearing system; with eventual breakup of turbine head 152 or its separation from turbine shaft 160. Obviously a steel head and shaft is more resistant to breakup than a plastic one. However, steel has a high thermal conductivity and coefficient of thermal expansion. This means that turbine head 152 and turbine shaft 160 can become cold fast, and can chill the bearings by thermal conduction as well. This, in turn, means that turbine shaft 160 can become too loose or too tight in roller bearings 162, depending on the relative values of the coefficient of thermal expansion of the two components. As previously mentioned, coating a metal turbine head with an insulating material reduces this problem. It should be noted that turbine head 152 can not escape, or fall out of, turbine assembly 150 because it is held captive within a turbine shaft and roller bearing housing 164 by an external retaining ring 166 which attaches to turbine shaft 160. The external retaining ring is preferably, but not necessarily, made of stainless steel. Furthermore, turbine shaft 160 is actually cast onto turbine head 152 so that release is not possible. These precautions are important to prevent turbine head 152 from accidentally falling out of the apparatus onto a work piece if the apparatus is tipped over during installation, maintenance, removal, or when a telescope to which it is mounted moves to a horizon looking position. Turbine shaft and roller bearing housing 164 also provides support to roller bearings 162 and is preferably, but not necessarily, made of stainless steel.

The matter of lubrication of turbine assembly 150 must now be addressed. Turbine shaft 160 dips into a lubricant which is held in an oil case 168. The level of the lubricant can be set through an oil level observation window 170. Oil case 168 seals against turbine shaft and roller bearing housing 164 via O-ring 172. If the lubricant level is above or below oil level observation window 170, oil case 168 must be unscrewed and some lubricant must either be poured out or added. When turbine head 152 and turbine shaft 160 are spinning, splashing and centrifugal motion imparted to the lubricant by drag against turbine shaft 160, force lubricant into roller bearings 164 and thrust bearings 156. If a bare metal turbine head 152 is used, it may get so cold during operation that the lubricant may become too viscose for the bearings and turbine head to turn freely. In that case, the beam of carbon dioxide snowflakes will have the wrong dispersion angle as measured from the vertical direction. It has been found that the low temperature oil TUFOIL, manufactured by Kidde Inc. (Ashland, Mass. 01721), will remain free flowing down to −60° degrees F. This lubricant will minimize the oil viscosity problem. If a plastic turbine head 152 is used, care must be taken to insure that the lubricant is compatible with the plastic and will not dissolve, soften, chemically react with, or weaken turbine shaft 160. Lastly, it should be noted that even if thrust bearings 156 and roller bearings 162 are made of steels other than stainless steel, the thin coating of lubricant will usually keep corrosion from occurring. This has been proven out on a prototype, and to date no bearing corrosion has been observed.

Figure 3:
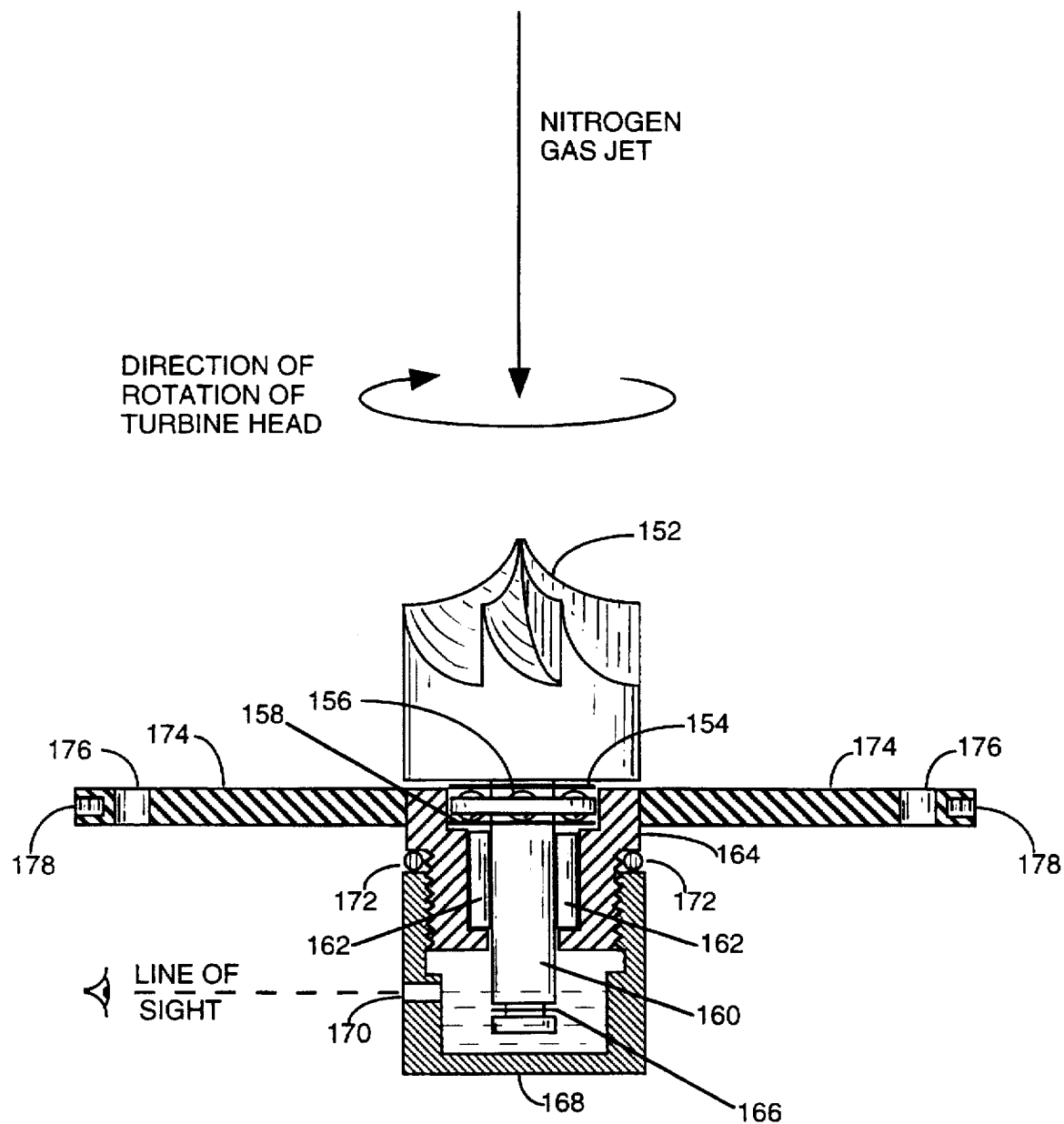
FIG. 3 shows a cross sectional side view of the turbine assembly.

The entire turbine assembly 150 is supported by a plurality of mounting arms 174 which have a plurality of mounting holes 176 (see FIG. 3). One mounting hole for each mounting arm. Other mounting arm designs are also possible. Mounting arms 174 can be welded to turbine shaft and roller bearing housing 164, or attached with fasteners. However, welds can break, and fasteners can come loose. Therefore, it is best to cut mounting arms 174 and housing 164 from a single piece of metal, or cast them as a single piece if possible. The mounting arms 174 should be coated with a thermally non conducting coating such as PLASTI-DIP. This will prevent the carbon dioxide flow from chilling mounting arms 174 and removing heat from turbine shaft and roller bearing housing 164 as well as roller bearings 162, turbine shaft 160, and the lubricant.

Next, the method of turning turbine head 152 is discussed. This is accomplished by a strong narrow jet of nitrogen gas that interacts with the flutes of turbine head 152, thereby causing rotation. It is important to have the nitrogen gas impinge on turbine head 152 very close to top-dead-center, otherwise the angular speed of turbine head 152 will drop dramatically and efficiency will be lost. Other gases besides nitrogen can be used to drive turbine head 152. One early prototype used another stream of carbon dioxide gas and snowflakes. This had the advantage of producing more snowflakes, but turbine head 152, thrust bearings 156, roller bearings 162, and the lubricant became so cold that turbine head 152 would eventually stop turning. By contrast, nitrogen gas did not chill turbine head 152 and would create a thin boundary layer of warm gas near its surface to insulate turbine head 152 and prevent thrust bearings 156 and roller bearings 162 from freezing up.

The nitrogen gas jet subs s assembled as follows. First nitrogen gas emerges from a turbine nitrogen gas tank 200. The nitrogen gas then passes into a turbine nitrogen gas nipple 204 which is fastened to turbine nitrogen gas tank 200 by a turbine nitrogen gas nut 202. Next, the nitrogen gas passes through a turbine nitrogen gas excess flow check valve 206 which is connected directly to turbine nitrogen gas nipple 204 by pipe threads or some other convenient attachment mechanism. Next, the nitrogen gas passes into turbine nitrogen gas regulator 208 which produces a static outlet pressure between about 750 and 1800 psi, although other pressures may be used. The rotation rate of turbine head 152 and the dispersion angle of the carbon dioxide snowflakes will depend on the outlet nitrogen gas pressure. Turbine nitrogen gas regulator 208 is connected directly to turbine nitrogen gas filter 210 where potentially damaging particles are removed from the nitrogen gas flow. The filter is a high pressure type with a sintered stainless steel filter element. Other types of filters may be used with, or instead of, a particle filter. The turbine nitrogen gas filter is connected to a nitrogen flow pneumatic valve 212, which is normally closed, so that in the event of a power failure no nitrogen gas will escape. When the state of nitrogen flow pneumatic valve 210 is changed to the open position, gas can flow into a flexible turbine nitrogen gas line 220 up to a turbine nitrogen gas manual metering valve 230. Flexible turbine nitrogen gas line 220 preferably has a PTFE lining on the interior and a braided stainless steel outside jacket. This is the same type of line used to transport carbon dioxide; however, other types of line may work just as well. Turbine nitrogen gas manual metering valve 230 must be opened enough to allow the nitrogen gas flow to turn turbine head 152 at a speed that will give the desired dispersion of carbon dioxide snowflakes. At the exit end of turbine valve 230 there is a male pipe thread to male pipe thread nipple 232. This allows turbine valve 230 to be secured to mounting plate 90 and provides a passage for nitrogen gas to pass through that plate. On the bottom of mounting plate 90 is a coupling 235 which connects mounting plate 90 to tube 240. The jet of nitrogen gas which escapes through coupling 235 and tube 240 is narrow and very strong. Typically, tube 240 has a 0.635 cm (0.25 in.) outside diameter, a wall thickness of 0.0889 cm (35 mils), and a length of 55.88 cm (22 in.). Tube 240 should be about 23.5 cm (9.25 in.) from the top of turbine head 152 and is preferably made of stainless steel for strength and corrosion resistance. Fabrication of tube 240 from other materials, and with other dimensions, can work also. Tube 240 passes through support plate 140 for added strength and stability.

Mounting plate 90 and its associated parts, support plate 140, and turbine assembly 150 are all held together rigidly by a plurality of support rods 190 and a plurality of support rod nuts 192. Nuts 192 can be self locking aerospace fasteners, or ordinary nuts can be used with lock washers. These locking devices will prevent the apparatus from coming apart when it is suspended over some valuable piece of optics to be cleaned. Also mounting plate 90, support plate 140, and turbine assembly 150, have threaded mounting plate holes 92, threaded support plate holes 142, and threaded turbine assembly holes 176 respectively. The purpose of these holes is to allow for attachment of a skin or hard shell (usually, but not necessarily, of aluminum) to the apparatus. Brackets, or even pneumatic pistons, can be attached to this shell by welding or any other means. These devices allow the apparatus to be mounted in a fixed position, or moved into position for cleaning operations and then retracted. If a tight fitting shell is used, a hole should be drilled in it at a level between mounting plate 90 and support plate 150. This hole will prevent accidental pressurization of the shell in case a gas leak develops around one of the fittings below mounting plate 90. Lastly, any skin or shell can be coated to make it black, or give it some desired spectral emissivity, for astronomical telescope work.

The method of control of carbon dioxide flow pneumatic valve 42 and nitrogen flow pneumatic valve 212 must now be discussed. These valves are either open or closed, but are normally closed when there is zero gauge pressure in a carbon dioxide flow control gas line 300 (which is connected to carbon dioxide flow pneumatic valve 42) and a nitrogen flow control gas line 400 (which is connected to nitrogen flow pneumatic valve 212). When the gauge pressure is about 80 psig (this last figure depends on the particular pneumatic valve chosen) in lines 300 and 400, pneumatic valves 42 and 212 are open. The control gas is usually, but not necessarily, nitrogen. Furthermore, there is no mixing in the pneumatic valves of this control gas with the carbon dioxide used in cleaning, or the nitrogen used to drive turbine head 152. It is most convenient for the control gas to come from a separate tank, although it is possible for the control gas subsystem to share the same nitrogen tank that is used to drive the turbine head. Lines 300 and 400 (which can be made of copper, plastic, or preferably stainless steel) are connected to a carbon dioxide flow solenoid valve 310 and a nitrogen flow solenoid valve 410 respectively. These solenoid valves are three port valves, so that lines 300 and 400 are either connected to the atmosphere (zero gauge pressure) or to a pressurized nitrogen supply from a carbon dioxide flow solenoid valve control gas supply line 320 and a nitrogen flow solenoid valve control gas supply line 420 respectively. Supply lines 320 and 420 both receive there gas, and feed into, a control gas "T" 322. "T" 322 is, in turn, pressurized by a control gas regulator 330. Control gas regulator 330 is connected to a control gas nipple 340 which is bolted to a control gas tank 360 by a control gas nut 350.

Finally, the state of solenoid valves 310 and 410 is determined by an electrical signal from a pair of carbon dioxide flow solenoid control wires 500, and a pair of nitrogen flow solenoid control wires 505, respectively. When a voltage is present across these wire pairs, the state of solenoids 310 and 410 is such that pressurized control gas flows to pneumatic valves 42 and 212. When the voltage is zero, the solenoid valves dump the contents of lines 300 and 400 to the atmosphere, thereby closing pneumatic valves 42 and 212. This is the safe way to do things, but it is also possible to have pneumatic valves 42 and 212 closed when there is a voltage across wires 500 and 505. However, this scenario requires a constant supply of power to keep the apparatus in the "off" state and that is impractical. The wires 500 and 505 receive there voltage from a commercially available relay network 510 which is controlled by a signal through a relay control ribbon 520. Relay control ribbon 520 is connected to a computer 530 from which an operator may control the cleaning process.

MODE OF OPERATION OF INVENTION—FIGS. 1, 2 AND 3

Before operation of the apparatus can commence, the operator must specify the diameter D of the circular area to be cleaned. If the area is not circular, than the diameter of a circle which circumscribes the desired area must be specified. The value of D, together with the distance R between the piece to be cleaned and the bottom of drift tubes 120 (where carbon dioxide snowflakes exit), determines the required dispersion angle A, (which is half the apex angle of the exiting flow). Assuming that drift tubes 120 are perpendicular to the surface to be cleaned, trigonometry yields $$A = \text{Arc tan}(D/2R)$$

Once A is determined, carbon dioxide manual metering valves 70 and turbine nitrogen gas manual metering valve 230 must be adjusted by trial and error to give the desired value of A. An angle A as large as 60 degrees is possible. It should also be noted that the length of the flight path, L, of snowflakes cannot exceed about 10 meters or else the carbon dioxide snowflakes will sublime to the gas phase in flight. That is to say, $$10 \text{ meters} > \sqrt{(D/2)^2 + R^2}.$$

Of course, if drift tubes 120 are not perpendicular to the surface to be cleaned, then the area to be cleaned will not be circular, and the formulas above will not apply. Next, the user must open the valves on carbon dioxide tanks 10, turbine nitrogen gas tank 200, and control gas tank 360. The relay network 510 and computer 530 must also be plugged in. The final preparation which must be made before use is simply to check the lubrication level to make sure that it lies within oil level observation window 170. Over filling can result in oil overflow, while under filling can deprive parts of lubricant.

To operate the system a command is generated at computer 530. An electrical signal then passes through relay control ribbon 520, and relay network 510 sends power through wires 500 and 505 to solenoid valves 310 and 410. When these valves open, control gas from control gas tank 360 will flow through carbon dioxide flow control gas line 300 and nitrogen flow control gas line 400. The pneumatic valves 42 and 212 will then be opened. This action will allow liquid carbon dioxide to be throttled in nozzles 110 to produce snowflakes, and will also allow nitrogen gas to turn turbine head 152 resulting in scattering of snowflakes. Cleaning will now take place and requires about 10 seconds. Typically, cleaning uses about 780 gms (1.7 lbs.) of carbon dioxide per minute per drift tube.

SUMMARY, RAMIFICATION AND SCOPE

Accordingly, the reader will see that the high dispersion carbon dioxide snow apparatus of this patent provides a stream of snowflakes distributed over a broad angular range. This apparatus can be computer controlled, is easy to operate, and requires a minimum of maintenance.

Although the description above contains many specificities, these should not be construed as limiting the scope of the invention, but merely providing illustrations of some of the presently preferred embodiments of this invention. For example, most of the gas fittings described above (e.g. carbon dioxide nut 12, carbon dioxide nipple 14, etc.) are preferably made of stainless steel. However, other metals may also be used. Brass is a metal commonly used for such fittings, but it is not as clean as stainless steel. Plated carbon steel, alloy 400, and other metals can be used as well with varying degrees of performance. Parts in the carbon dioxide subsystem should have a nominal pressure rating of 750 psi (at 20 deg. centigrade) when American gas tanks are used. Parts in the nitrogen subsystem should have a nominal rating of 1800 psi (at 20 deg. C.) when used with American tanks. However, foreign gas tanks may contain gases at different pressures which may require parts with a higher pressure rating.

Furthermore, FIG. 1 shows only two drift tubes 120 and related hardware. In fact, many more drift tubes and their associated parts can be used to give a much higher total output of carbon dioxide snowflakes. A prototype having four drift tubes tested very well. It may also be possible to make drift tubes 120 out of stainless steel or some other metal, plastic, or ceramic, instead of polycarbonate.

It may also be possible to replace turbine assembly 150 by a stationary cone-like obstruction which deflects part of the snowflake stream into different directions. In that case, parts associated with the turbine nitrogen gas flow can be eliminated. However, a fixed obstruction probably would not give the same uniformity of coverage that is available with the turbine assembly.

The number of support rods 190 can also be increased for greater structural stability, and more than one support plate 140 can be used. Furthermore, support rods 190 can be attached by means of welding instead of the use of support rod nuts 192.

Another minor variation on the basic invention would be to use wireless communications between, for example, computer 530 and the relay network 510. This would be particularly useful for telescopes in remote locations.

Finally, the system may also be operated purely manually, in which case the pneumatic valves, solenoid valves, relay, computer, and control gas tank with its related plumbing are not needed.

I claim:

1. A carbon dioxide snowflake producing apparatus, comprising:
   (a) a primary manifold, whereby liquid carbon dioxide can enter into said carbon dioxide snowflake producing apparatus,
   (b) a carbon dioxide flow pneumatic valve connected to said primary manifold, whereby the flow of liquid carbon dioxide from said primary manifold can be interrupted, (c) a flexible large diameter carbon dioxide high pressure line connected to said carbon dioxide flow pneumatic valve, whereby liquid carbon dioxide can exit said carbon dioxide flow pneumatic valve, (d) a secondary manifold, connected to said flexible large diameter carbon dioxide high pressure line, having a plurality of outlets, whereby liquid carbon dioxide can exit said secondary manifold through the outlets, (e) a plurality of carbon dioxide flow manual metering valves connected to the outlets of said secondary manifold, whereby the flow of liquid carbon dioxide can be regulated, (f) a mounting plate connected to the outlet of said carbon dioxide flow manual metering valves, whereby said carbon dioxide flow manual metering valves may be supported, (g) a plurality of nozzles connected to said mounting plate so that each of said carbon dioxide flow manual metering valves regulates the flow of carbon dioxide through one of said nozzles, whereby liquid carbon dioxide is converted into carbon dioxide snowflakes, (h) a plurality of drift tubes con to said nozzles in a one to one fashion, whereby carbon dioxide snowflakes may grow as they pass through said drift tubes, (i) a turbine assembly connected to said mounting plate and positioned below the said drift tubes, whereby carbon dioxide snowflakes may be scattered into a variety of directions, (j) a tube connected to said mounting plate and positioned above said turbine assembly, whereby a jet of nitrogen gas may be directed toward said turbine assembly, (k) a turbine nitrogen gas manual metering valve connected to said mounting plate, whereby the flow of nitrogen gas to said tube may be controlled, (l) a nitrogen flow pneumatic valve connected to said turbine nitrogen gas manual metering valve, whereby a flow of nitrogen gas can be interrupted, (m) a nipple connected to said nitrogen flow pneumatic valve, whereby nitrogen gas may be injected, (n) a carbon dioxide flow solenoid valve connected to said carbon dioxide flow pneumatic valve, whereby a flow of control gas may be injected into said carbon dioxide flow pneumatic valve, (o) a nitrogen flow solenoid valve connected to said nitrogen flow pneumatic valve, whereby a flow of control gas may be injected into said nitrogen flow pneumatic valve, (p) a relay network electrically connected to said carbon dioxide flow solenoid valve and said nitrogen flow solenoid valve, whereby the solenoid valves may be opened or closed, and (q) a computer connected to said relay network, whereby control signals may be generated for said relay network.

2. A carbon dioxide snowflake producing apparatus, comprising:

(a) a plurality of carbon dioxide tank flexible high pressure lines, whereby liquid carbon dioxide can enter said carbon dioxide snowflake producing apparatus, (b) a plurality of carbon dioxide flow manual metering valves connected to said carbon dioxide tank flexible high pressure lines, whereby the flow of liquid carbon dioxide may be controlled, (c) a mounting plate connected to the outlet of said carbon dioxide flow manual metering valves, whereby said carbon dioxide flow manual metering valves may be supported, (d) a plurality of nozzles connected to said mounting plate so that each of said carbon dioxide flow manual metering valves controls the flow of carbon dioxide through one of said nozzle, whereby liquid carbon dioxide is converted into carbon dioxide snowflakes, (e) a plurality of drift tubes connected to said nozzles in a one to one fashion, whereby carbon dioxide snowflakes may grow as they pass through said drift tubes, (f) a turbine assembly connected to said mounting plate and positioned below said drift tubes, whereby carbon dioxide snowflakes may be scattered into various directions, (g) a tube connected to said mounting plate and positioned above said turbine assembly, whereby a jet of nitrogen gas may be directed toward said turbine assembly, (h) a turbine nitrogen gas manual metering valve connected to said mounting plate, whereby the flow of nitrogen gas to said tube may be controlled, and (i) a nipple connected to said turbine nitrogen gas manual metering valve, whereby nitrogen gas may be injected.

3. A carbon dioxide snowflake producing apparatus, comprising:

(a) a plurality of carbon dioxide tank flexible high pressure lines, whereby liquid carbon dioxide can enter into said carbon dioxide snowflake producing apparatus, (b) a mounting plate connected to said high pressure lines, (c) a plurality of nozzles mounted to, and vertically below, said mounting plate, whereby liquid carbon dioxide from said high pressure lines can pass through said mounting plate and be throttled into carbon dioxide snowflakes in said nozzles, (d) a plurality of support rods mounted to, and vertically below, said mounting plate, (e) a scattering means connected to said support rods and positioned below said nozzles, whereby snowflakes are scattered into various directions below the apparatus.

* * * * *